(12) United States Patent
Konokawa et al.

(10) Patent No.: US 8,642,676 B2
(45) Date of Patent: Feb. 4, 2014

(54) POLYMERIZABLE COMPOSITION AND ACRYLIC RESIN FILM

(75) Inventors: Yuuhei Konokawa, Hiroshima (JP);
Kousuke Fujiyama, Hiroshima (JP);
Yasuhiko Nabeshima, Hiroshima (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 13/496,211

(22) PCT Filed: Sep. 10, 2010

(86) PCT No.: PCT/JP2010/065588
§ 371 (c)(1),
(2), (4) Date: May 25, 2012

(87) PCT Pub. No.: WO2011/033998
PCT Pub. Date: Mar. 24, 2011

(65) Prior Publication Data
US 2012/0225971 A1 Sep. 6, 2012

(30) Foreign Application Priority Data
Sep. 15, 2009 (JP) ................. 2009-213468

(51) Int. Cl.
*C08F 20/22* (2006.01)
*B29D 11/00* (2006.01)
*C08F 2/46* (2006.01)
*C08G 61/04* (2006.01)

(52) U.S. Cl.
USPC ............... 522/183; 522/182; 522/178; 522/1; 520/1

(58) Field of Classification Search
USPC .................... 522/183, 182, 178, 1; 520/1
See application file for complete search history.

(56) References Cited

U.S. PATENT DOCUMENTS

| | | | |
|---|---|---|---|
| 5,247,038 A | 9/1993 | Fukushima et al. | |
| 6,866,899 B2 * | 3/2005 | Wright | ......... 427/516 |
| 2012/0127757 A1 | 5/2012 | Konokawa et al. | |

FOREIGN PATENT DOCUMENTS

| | | |
|---|---|---|
| JP | 2 261852 | 10/1990 |
| JP | 4 164910 | 6/1992 |
| JP | 10-279765 | * 10/1998 |
| JP | 2000 154297 | 6/2000 |
| JP | 2001 200020 | 7/2001 |
| JP | 2005 48059 | 2/2005 |
| JP | 2007-224264 | * 9/2007 |

OTHER PUBLICATIONS

International Search Report Issued Oct. 12, 2010 in PCT/JP10/65588 Filed Sep. 10, 2010.
Extended Search Report issued Jun. 4, 2013 in European Patent Application No. 10817111.7.

* cited by examiner

*Primary Examiner* — Ling Choi
*Assistant Examiner* — Jessica E Whiteley
(74) *Attorney, Agent, or Firm* — Oblon, Spivak, McClelland, Maier & Neustadt, L.L.P.

(57) ABSTRACT

A polymerizable composition comprising a syrup composition ($\alpha$) and a polymerization initiator ($\beta$), wherein the syrup composition ($\alpha$) contains a copolymer (C) and at least one (meth)acrylate selected from a di(meth)acrylate (A) represented by the general formula (1) and a mono(meth)acrylate (B), wherein the copolymer (C) is obtained by polymerization of a monomer mixture containing 1 to 60 wt % of the di(meth)acrylate (A) represented by the following general formula (1): $CH_2=CR^1-COO-(X)-COCR^1=CH_2$ (1) (wherein, (X) represents at least one residue selected from a polyalkylene glycol, a polyester diol and a polycarbonate diol having a number-average molecular weight of 500 or more, and $R^1$ represents H or $CH_3$) and 40 to 99 wt % of the mono(meth)acrylate (B); and an acrylic resin film 1 having flexibility and high transparency obtained by polymerizing and curing the polymerizable composition.

17 Claims, 1 Drawing Sheet

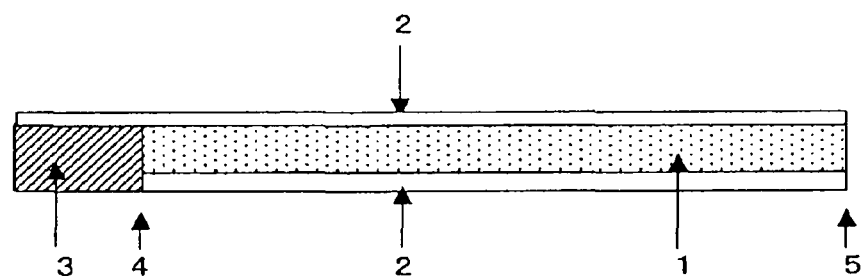

POLYMERIZABLE COMPOSITION AND ACRYLIC RESIN FILM

CROSS REFERENCE TO RELATED APPLICATION

This application is a 371 of PCT/JP2010/065588, filed on Sep. 20, 2010, and claims priority to Japanese Patent Application No. 2009-213468, filed on Sep. 15, 2009.

TECHNICAL FIELD

The present invention relates to a polymerizable composition and an acrylic resin film.

BACKGROUND ART

Acrylic resins are used in various applications such as lenses, automobile parts, illumination parts and electronic displays because of its excellent optical properties. Conventional acrylic resins, however, have a defect of low flexibility.

As a method of obtaining an acrylic resin molded article having flexibility, patent document 1, for example, suggests a method of obtaining a molded article by cast polymerization of a polymerizable composition containing a specific poly(meth)acrylate and a monovinyl monomer as main components.

If an acrylic resin film is tried to be produced by a continuous plate making method in which a polymerizable composition is fed on an endless belt or a base belt to form a coated film of the polymerizable composition and an endless belt or a base film which is transferred in the same direction and at the same speed as the above-described endless belt is laminated thereon, then, the composition is polymerized, for the purpose of improving productivity, however, there is a problem that a syrup tends to exude and leak from a clearance between the endless belts or between the endless belt and the base film due to low viscosity of the polymerizable composition and production of an acrylic resin film by the continuous plate making method is difficult.

PRIOR TECHNICAL DOCUMENT

Patent Document

Patent document 1: JP-A No. 4-164910

SUMMARY OF THE INVENTION

Problem to be Solved by the Invention

The present invention has an object of providing a polymerizable composition with which an acrylic resin film having flexibility and high transparency can be produced continuously, and a method of continuously producing an acrylic resin film using the polymerizable composition.

Means for solving the Problem

The present invention is a polymerizable composition comprising a syrup composition (α) and a polymerization initiator (β),
wherein the syrup composition (α) contains a copolymer (C) and at least one (meth)acrylate selected from a di(meth)acrylate (A) represented by the general formula (1) and a mono(meth)acrylate (B),
wherein the copolymer (C) is obtained by polymerization of a monomer mixture containing
1 to 60 wt % of the di(meth)acrylate (A) represented by the following general formula (1):

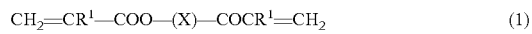

$$CH_2=CR^1—COO—(X)—COCR^1=CH_2 \qquad (1)$$

wherein, (X) represents at least one residue selected from a polyalkylene glycol, a polyester diol and a polycarbonate diol having a number-average molecular weight of 500 or more, and $R^1$ represents H or $CH_3$ and 40 to 99 wt % of the mono(meth)acrylate (B).

Further, the present invention is an acrylic resin film obtained by polymerizing and curing the present polymerizable composition [hereinafter, referred to as "present film"].

Effect of the Invention

By use of the present polymerizable composition, an acrylic resin film having flexibility and high transparency can be obtained by a continuous plate making method utilizing heating or irradiation with an active energy ray. This acrylic resin film is suitable for various optical members.

BRIEF EXPLANATION OF DRAWINGS

FIG. 1 is a schematic constitutional view showing one example of an apparatus for measuring the luminance of the present film.

MODES FOR CARRYING OUT THE INVENTION

Component (A)

The component (A) used in the present invention is a monomer represented by the general formula (1).

The component (A) is used to form a crosslinked structure composed of a long chain molecule rich in softness in a polymer obtained by polymerization of the present polymerizable composition, thereby imparting flexibility to the present film.

In the general formula (1), (X) represents at least one residue selected from a polyalkylene glycol, a polyester diol and a polycarbonate diol. By selecting the above-described residue as (X), an acrylic resin film can be endowed with transparency and flexibility.

The number-average molecular weight of (X) is 500 or more, preferably 500 to 10,000, more preferably 550 to 3,000, particularly preferably 600 to 1500.

When the number-average molecular weight of (X) is 500 or more, the flexibility of the present film can be excellent. The number-average molecular weight of (X) is preferably 10,000 or less from the standpoint of the transparency of the present film. When the number-average molecular weight of (X) is 550 to 3000, a film further excellent in flexibility and transparency can be obtained, and when the number-average molecular weight of (X) is 600 to 1400, a film having sufficient flexibility and excellent in transparency can be obtained as a light guiding film.

The form of (X) may be any of a repeating unit composed of a single composition or a repeating unit composed of several compositions.

When the form of (X) is a repeating unit composed of several compositions, the repeating unit composition may be any of a random composition, a block composition or an alternate composition.

Examples of (X) include polyalkylene glycol residues such as polyethylene glycols having a repetition unit number of 12 or more such as dodecaethylene glycol, tridecaethylene glycol, tetradecaethylene glycol, pentadecaethylene glycol and hexadecaethylene glycol polypropylene glycols having a repetition unit number of 9 or more such as nonapropylene glycol, decapropylene glycol, undecapropylene glycol, dodecapropylene glycol and tridecapropylene glycol, polybutylene glycols having a repetition unit number of 7 or more such as heptabutylene glycol, octabutylene glycol, nonabutylene glycol, decabutylene glycol and undecabutylene glycol; polyester diol residues which are reaction products of the above-described polyalkylene glycol and a low molecular weight diol such as ethylene glycol, propylene glycol, butylene glycol, 1,5-pentanediol, 1,6-hexanediol and 1,4-cyclohexanedimethanol, with an acid component such as a dibasic acid such as adipic acid, succinic acid, phthalic acid, hexahydrophthalic acid and terephthalic acid or an anhydride thereof; and polycarbonate diol residues which are reaction products of the above-described polyalkylene glycol and the above-described low molecular weight diol with a carbonate such as dimethyl carbonate.

The component (A) can be used singly or two or more components (A) can be used in combination.

Of them, polyalkylene glycol residues are preferable as (X) from the standpoint of the flexibility of the present film and polybutylene glycol residues having a repetition unit number of 7 or more such as octabutylene glycol, nonabutylene glycol, decabutylene glycol and undecabutylene glycol are preferable as (X) from the standpoint of the hydrophobicity of the present film.

As specific examples of the component (A), Acryester PBOM (polybutylene glycol dimethacrylate, Mn of X is 648) manufactured by Mitsubishi Rayon Co., Ltd., Blenmer PDE-600 (polyethylene glycol dimethacrylate, Mn of X is 616), Blenmer PDP-700 (polypropylene glycol dimethacrylate, Mn of X is 696), Blenmer PDT-650 (polytetramethylene glycol dimethacrylate, Mn of X is 648), Blenmer 40PDC1700B (random copolymer dimethacrylate composed of polyethylene glycol and polypropylene glycol, Mn of X is 1704) and Blenmer ADE-600 (polyethylene glycol diacrylate, Mn of X is 616) manufactured by NOF Corporation, and NK Ester A-600 (polyethylene glycol diacrylate, Mn of X is 616), NK Ester A-1000 (polyethylene glycol diacrylate, Mn of X is 1012), NK Ester APG-700 (polypropylene glycol diacrylate, Mn of X is 696), NK Ester 14G (polyethylene glycol dimethacrylate, Mn of X is 616) and NK Ester 23G (polyethylene glycol dimethacrylate, Mn of X is 1012) manufactured by Shin-Nakamura Chemical Co., Ltd. (all are trade names) are industrially available and can be suitably used.

In the present invention, "(meth)acrylate" means at least one selected from "acrylate" and "methacrylate".

Component (B)

The component (B) used in the present invention is used to improve the transparency and the elastic modulus of the acrylic resin film of the present invention.

Examples of the component (B) include alkyl(meth)acrylates such as methyl(meth)acrylate, ethyl(meth)acrylate, n-propyl(meth)acrylate, isopropyl(meth)acrylate, n-butyl (meth)acrylate, iso-butyl(meth)acrylate, t-butyl(meth)acrylate, n-propyl(meth)acrylate, isopropyl(meth)acrylate, 2-ethylhexyl(meth)acrylate, lauryl(meth)acrylate, tridecyl(meth) acrylate, tetradecyl(meth)acrylate and stearyl(meth)acrylate; aromatic methacrylates such as phenyl(meth)acrylate and benzyl(meth)acrylate; alicyclic(meth)acrylates such as isobornyl(meth)acrylate, cyclohexyl(meth)acrylate, methylcyclohexyl(meth)acrylate, t-butylcyclohexyl(meth)acrylate, 1-adamantyl(meth)acrylate, 2-methyl-2-adamantyl(meth) acrylate and 2-ethyl-2-adamantyl(meth)acrylate; and heterocyclic(meth)acrylates such as glycidyl(meth)acrylate. These can be used singly or in combination. Of them, methyl methacrylate is preferable from the standpoint of the transparency of the present film.

Present Monomer Mixture

In the present invention, the present monomer mixture is a monomer raw material for obtaining the copolymer (C), and contains the component (A) and the component (B).

The content of the component (A) in the present monomer mixture is 1 to 60 wt %, preferably 5 to 40 wt %, further preferably 10 to 30 wt %. When the content of the component (A) is 1 wt % or more, compatibility of the copolymer (C) and the component (A) can be excellent, and the present film excellent in transparency can be obtained. When the content of the component (A) is 60 wt % or less, a partial polymer composition (D) to be described later can keep flowability even in generation of a partially-crosslinked gelled polymer.

The content of the component (B) in the present monomer mixture is 40 to 99 wt %, preferably 60 to 95 wt %, further preferably 70 to 90 wt %. When the content of the component (B) is 99 wt % or less, compatibility of the copolymer (C) and the component (A) can be excellent, and the present film excellent in transparency can be obtained. When the content of the component (B) is 40 wt % or more, generation of a partially-crosslinked gelled polymer of a partial polymer composition (D) to be described later is suppressed, and flowability thereof can be kept.

In the present invention, the present monomer mixture is capable of, if necessary, containing other vinyl monomers than the component (A) and the component (B), in a range not deteriorating flexibility and transparency.

Examples of the other vinyl monomers include monovinyl monomers such as aromatic vinyl monomers such as styrene and α-methylstyrene, nitrile group-containing vinyl monomers such as acrylonitrile and methacrylonitrile; and polyvinyl monomers such as ethylene glycol di(meth)acrylate other than the component (A). These can be used singly or in combination.

Copolymer (C)

The copolymer (C) is obtained by polymerization of the present monomer mixture, and used to improve thickness accuracy, improve operability and improve transparency in polymerizing and curing a polymerizable composition to produce an acrylic resin film.

The content of the constituent unit derived from the component (A) in the copolymer (C) is 1 to 60 wt %, preferably 5 to 40 wt %, further preferably 10 to 30 wt %. When the content of the constituent unit derived from the component (A) is 1 wt % or more, compatibility of the copolymer (C) and the component (A) can be excellent and the present film excellent in transparency can be obtained. When the content of the constituent unit derived from the component (A) is 60 wt % or less, the polymerizable composition can keep flowability even by generation of a partially-crosslinked gelled polymer.

The content of the constituent unit derived from the component (B) in the copolymer (C) is 40 to 99 wt %, preferably 60 to 95 wt %, further preferably 70 to 90 wt %. When the content of the constituent unit derived from the component (B) is 99 wt % or less, compatibility of the copolymer (C) and the component (A) can be excellent and the present film excellent in transparency can be obtained. When the content of the constituent unit derived from the component (B) is 40 wt % or more, generation of a partially-crosslinked gelled polymer of the polymerizable composition is suppressed, and flowability thereof can be kept.

The copolymer (C) is obtained by adding a polymerization initiator (E) to the present monomer mixture and polymerizing this. Examples of the polymerization initiator (E) include organic peroxide type polymerization initiators such as benzoyl peroxide, lauroyl peroxide, t-butyl peroxy isobutyrate, t-butyl peroxy-2-ethyl hexanoate, t-butyl peroxy neodecanoate, t-hexyl peroxy pivalate, diisopropyl peroxy dicarbonate and bis(4-t-butylcyclohexyl)peroxy dicarbonate, and azo type polymerization initiators such as 2,2'-azobisisobutyronitrile, 2,2'-azobis(2,4-dimethylvaleronitrile), 2,2'-azobis(4-methoxy-2,4-dimethylvaleronitrile).

The addition amount of the polymerization initiator (E) is preferably 0.001 to 5 parts by weight, more preferably 0.005 to 0.1 parts by weight and particularly preferably 0.01 to 0.03 parts by weight with respect to 100 parts by weight the present monomer mixture.

Partial Polymer Composition (D)

In preparing the polymerizable composition of the present invention, it is preferable to produce a partial polymer composition (D) obtained by partial polymerization of the present monomer mixture. The partial polymer composition (D) is a syrup-like composition containing the copolymer (C) composed of the component (A) and the component (B) which is a partial polymer of the present monomer mixture dissolved in a mixture of the component (A) and the component (B).

The viscosity of the partial polymer composition (D) is preferably 100 to 5,000 mPa·s.

When the viscosity of the partial polymer composition (D) is 100 mPa·s or more, a film excellent in thickness accuracy is obtained in forming a continuous coated film of the polymerizable composition containing the partial polymer composition (D) on a continuous sheet-shaped material, then, polymerizing the continuous coated film of the present polymerizable composition by continuous heating or irradiation with an active energy ray to produce the present film. When the viscosity of the partial polymer composition (D) is 5,000 mPa·s or less, there is a tendency that generation of a partially crosslinked gelled polymer of the partial polymer composition (D) is suppressed and a film of high transparency can be produced.

In the present invention, the content of the partial polymer of the present monomer mixture in the partial polymer composition (D) is preferably 5 to 50 wt %, more preferably 10 to 40 wt %. When the content of the partial polymer composition (D) is 5 wt % or more, there is a tendency that the viscosity of the partial polymer composition (D) can be regulated at a suitable level. When the content of the partial polymer composition (D) is 50 wt % or less, there is a tendency that generation of a partially crosslinked gelled polymer of the partial polymer composition (D) is suppressed and a film of high transparency can be produced.

The polymerization initiator to be used in polymerization of the present monomer mixture for obtaining the partial polymer composition (D) includes the same materials as the above-described polymerization initiator (E).

The addition amount of the polymerization initiator (E) is preferably 0.001 to 5 parts by weight, more preferably 0.005 to 0.1 parts by weight and particularly preferably 0.01 to 0.03 parts by weight with respect to 100 parts by weight of the present monomer mixture.

In obtaining the partial polymer composition (D), a chain transfer agent can be added into the present monomer mixture, if necessary, for the purpose of preventing generation of a partially crosslinked gelled polymer.

Examples of the chain transfer agent include alkylmercaptans such as n-butylmercaptan, n-dodecylmercaptan and n-octylmercaptan, and α-methylstyrene dimer.

The use amount of the chain transfer agent is preferably 0.01 to 10 parts by weight, more preferably 0.1 to 5 parts by weight and particularly preferably 0.2 to 0.5 parts by weight with respect to 100 parts by weight of the present monomer mixture.

When the addition amount of the chain transfer agent is 0.01 part by weight or more, gelling of the partial polymer composition (D) tends to be suppressed. When the addition amount thereof is 10 parts by weight or less, the viscosity of the partial polymer composition (D) tends to be regulated at a suitable level.

In the present invention, a polymerization inhibitor can be added into the present monomer mixture, if necessary, for avoiding coloration and natural curing of the partial polymer composition (D).

Examples of the polymerization inhibitor include hydroquinone, hydroquinone monomethyl ether, 2,6-di-t-butyl-4-methylphenol and 2,4-dimethyl-6-t-butylphenol. These can be used singly or in combination.

The production method of the partial polymer composition (D) includes, for example, methods in which the present monomer mixture is charged in a reaction vessel equipped with a cooling tube, a thermometer and a stirring machine, heating thereof is initiated while stirring, a polymerization initiator is added when a prescribed temperature is attained, the temperature in the reaction vessel is made constant and maintained for a prescribed time, then, the mixture is quenched to around room temperature by cooling under reduced pressure and the like to stop polymerization thereof.

Syrup Composition (α)

The syrup composition (α) contains at least one (meth) acrylate selected from the component (A) and the component (B), and the copolymer (C).

The sum of the content of the component (A) and the content of the constituent unit derived from the component (A) in the copolymer (C) in the syrup composition (α) is preferably 10 to 90 wt %, more preferably 15 to 65 wt % and particularly preferably 20 to 60 wt % from the standpoint of the flexibility of the present film. The proportion of the copolymer (C) in the syrup composition (α) is preferably 3 to 50 wt %, more preferably 5 to 40 wt %.

In the present invention, the syrup composition (α) is capable of containing other vinyl monomers than the component (A) and the component (B), if necessary.

Examples of the other vinyl monomers include monovinyl monomers such as aromatic vinyl monomers such as styrene and α-methylstyrene, nitrile group-containing vinyl monomers such as acrylonitrile and methacrylonitrile; and polyvinyl monomers such as ethylene glycol di(meth)acrylate other than the component (A). These can be used singly or in combination.

The method of producing the syrup composition includes
(i) a method in which the copolymer (C) is dissolved in a monomer containing at least one (meth)acrylate selected from the component (A) and the component (B), and
(ii) a method in which the partial polymer composition (D) obtained by polymerization of a first monomer mixture containing 1 to 60 wt % of the component (A) and 40 to 99 wt % of the component (B) (here, the sum of the content of the component (A) and the content of the component (B) is 100 wt %) is mixed with a second monomer mixture containing at least one (meth)acrylate selected from the component (A) and the component (B).

For suppressing phase separation during polymerization, the method (ii) is preferable, and further, it is preferable that the content rate of the component (A) in the second monomer mixture is larger than the content rate of the component (A) in the first monomer mixture, and the content rate of the component (B) in the second monomer mixture is smaller than the content rate of the component (B) in the first monomer mixture. Particularly, this method is effective for suppressing phase separation, when the sum of the content rate of the component (A) and the content rate of the constituent unit derived from the component (A) in the copolymer (C) in the syrup composition (α) is adjusted to 10 wt % or more.

In the method (ii), the proportion of the partial polymer composition (D) in the syrup composition (α) is preferably 30 to 95 wt %, more preferably 40 to 95 wt %.

Polymerization Initiator (β)

In the present invention, a polymerization initiator (β) is used for polymerizing the syrup composition (α).

The polymerization initiator (β) used for polymerization of the syrup composition (α) includes thermal polymerization initiators or photopolymerization initiators to be used in thermal polymerization or active energy ray polymerization.

The thermal polymerization initiator includes, for example, the same materials as the polymerization initiator (E) to be used for polymerization of the present monomer mixture.

Examples of the photopolymerization initiator include 1-hydroxy-cyclohexylphenylketone, 2-hydroxy-2-methyl-1-phenylpropan-1-one, methyl phenyl glyoxylate, acetophenone, benzophenone, diethoxyacetophenone, 2,2-dimethoxy-2-phenylacetophenone, 1-phenyl-1,2-propanedione-2-(o-ethoxycarbonyl)oxime, 2-methyl[4-(methylthio) phenyl]-2-morpholino-1-propanone, benzyl, benzoin methyl ether, benzoin ethyl ether, benzoin isopropyl ether, benzoin isobutyl ether, 2-chlorothioxanthone, isopropylthioxanthone, 2,4,6-trimethyl-benzoyl diphenylphosphine oxide, benzoyl diphenylphosphine oxide, 2-methyl-benzoyl diphenylphosphine oxide and benzoyl dimethoxyphosphine oxide. These can be used singly or in combination.

The addition amount of the above-described thermal polymerization initiator or photopolymerization initiator in the syrup composition (α) is preferably 0.005 to 5 parts by weight, more preferably 0.01 to 1 parts by weight and particularly preferably 0.05 to 0.5 parts by weight with respect to 100 parts by weight of the syrup composition (α). When the compounding amount of the thermal polymerization initiator or photopolymerization initiator is 5 parts by weight or less, there is a tendency that coloration of the present film can be suppressed. When the compounding amount of the thermal polymerization initiator or photopolymerization initiator is 0.005 parts by weight or more, there is a tendency that the polymerization time is not too long and suitable.

In the present invention, if necessary, thermal polymerization and active energy ray polymerization can be used together in polymerization of the syrup composition (α).

Present Polymerizable Composition

The present polymerizable composition contains the syrup composition (α) and the polymerization initiator (β).

The polymerization initiator (β) may be fed in a process of polymerizing the first monomer mixture to obtain the partial polymer composition (D) or may be fed in polymerizing the second monomer mixture, and it is preferable that this is fed in polymerizing the second monomer mixture.

The viscosity of the present polymerizable composition is preferably 100 to 5000 mPa·s. When the viscosity of the present polymerizable composition is 100 mPa·s or more, a film excellent in thickness accuracy is obtained in forming a continuous coated film of the polymerizable composition on a continuous base film, then, polymerizing the coated film of the present polymerizable composition by continuous heating or irradiation with an active energy ray to produce the continuous present film. When the viscosity of the present polymerizable composition is 5,000 mPa·s or less, compatibility of the present polymerizable composition becomes suitable level and a film of high transparency can be produced.

In the present invention, if necessary, a releasing agent can be compounded into the present polymerizable composition. The compounding amount of the releasing agent is preferably 0.005 to 0.5 parts by weight with respect to 100 parts by weight of the syrup composition (α). When the compounding amount of the releasing agent is 0.005 parts by weight or more, there is a tendency that releasability is excellent in peeling the resultant present film from a sheet-shaped material such as a polyethylene terephthalate (PET) film, a stainless steel plate and the like to be used as a mold. When the compounding amount of the releasing agent is 0.5 parts by weight or less, there is a tendency that the water absorbing property and the surface condition of the present film can be excellent.

Examples of the releasing agent include A-OT manufactured by Mitsui Cytec Ltd. (trade name, sodium di(2-ethylhexyl) sulfosuccinate) and JP-502 manufactured by Johoku Chemical Co., Ltd. (trade name, 55:45 mixture of diethyl phosphate and monoethyl phosphate).

In the present invention, various additives such as a lubricant, a plasticizer, an antibacterial agent, an antifungal agent, a photostabilizer, an ultraviolet absorber, a blueing agent, a dye, an antistatic agent and a heat stabilizer can be added into the present polymerizable composition, according to the object.

The present polymerizable composition can be polymerized by at least one method selected from a thermal polymerization method and an active energy ray polymerization method.

Continuous Sheet-Shaped Material

In the present invention, a continuous sheet-shaped material can be used as a mold and a continuous coated film of the present polymerizable composition can be formed on the continuous sheet-shaped material, for producing the present film.

Examples of the continuous sheet-shaped material include a polyethylene terephthalate (PET) film and a stainless steel plate.

The PET film includes Toyobo Ester Film E5001 (manufactured by TOYOBO Co., Ltd., trade name) and Cosmo Shine A4100 (manufactured by TOYOBO Co., Ltd., trade name).

The continuous sheet-shaped material having a thickness of, for example, 0.01 to 3 mm can be used.

Present Film

The present film is obtained by polymerizing and curing the polymerizable composition of the present invention. The production method of the present film includes, for example, a method in which a polymerizable composition is poured into a mold facing a belt or a mold, and the composition is polymerized by heat or active energy ray and the like. The belt or mold includes those formed of a plastic film such as a PET film, a metal such as stainless steel and glass. The production method of the present film includes also methods in which a continuous coated film of the present polymerizable composition is formed on a continuous sheet-shaped material, then, the coated film of the present polymerizable composition is polymerized by continuous heating or irradiation with an active energy ray, further, an acrylic resin film which is a polymerized material of the coated film of the resultant polymerizable composition is peeled from the sheet-shaped material.

The present film is excellent in flexibility and transparency.

It is preferable that the elongation at break of the present film is 10% or more in performing a tensile test at 23° C. and 500 mm/min using a test piece of No. 1 dumbbell according to JIS K6251.

The present film can be used suitably as an optical member since the film is excellent in the above-described property.

Examples of the above-described optical member include a Fresnel lens, a polarization film, a polarizer protective film, a phase difference film, a light diffusion film, a view angle enlarging film, a reflection film, an antireflection film, an antiglare film, a luminance improving film, a prism sheet, a micro lens array, an electric conductive film for touch panel, a reflective material used for roadway signs and the like, a solar battery film, a film for protection of the front surface of a cellular telephone, a film for improvement of the contrast of a cellular telephone, a thin liquid crystal display, a flat panel display, a plasma display, a cellular telephone display, a cellular telephone key pad illumination, a personal computer key board illumination, and a side light type light guide plate used for other signs and the like.

The apparatus for evaluating the luminance of the present film includes, for example, a measurement apparatus as shown in FIG. 1. A light emitted from a light source 3 is introduced into the present film 1 of which surface is coated with a reflection sheet 2 from the end face (i) of the film 1, transmitted through in the film and emitted from the end face (ii) thereof.

In measuring the luminance of the present film, the distance from the end face (i) to the end face (ii) is preferably 5 cm or more when envisaging the length of a light guide plate used in a portable display such as a cellular telephone. The distance is more preferably 10 cm or more when envisaging use in a display such as a middle size portable game machine.

When the distance from the end face (i) to the end face (ii) is 10 cm or more, there is a tendency that a slight difference in transmission loss due to light absorption, scattering or reflection can be observed as a large difference in luminance.

A film manifesting high luminance even if the distance from the end face (i) to the end face (ii) is long is suitable as an optical member because of high transparency, and particularly, suitable for a light guide plate requiring transparency through a long light path.

The thickness of the present film is preferably 500 μm or less, more preferably 10 to 500 μm, further preferably 25 to 400 μm. When the thickness of the present film is 500 μm or less, there is a tendency that the film can be suitably used for an optical member, particularly, a thin type liquid guide plate.

The production method of the present film includes, for example, a method in which the present polymerizable composition is fed on an endless belt, a film being transferred in the same direction and at the same speed as the endless belt is laminated thereon, then, the present polymerizable composition is polymerized by heating or irradiation with an active energy ray, further, the film being transferred in the same direction and at the same speed as the endless belt is peeled from an acrylic resin film which is a polymerized material of the coated film of the present polymerizable composition, and the resultant acrylic resin film is peeled continuously from the endless belt.

When the present polymerizable composition is polymerized by irradiation with an active energy ray, the active energy ray to be used includes visible light, ultraviolet ray, infrared ray, X ray, α ray, β ray, electron beam and γ ray, and visible light and ultraviolet ray are particularly preferable.

When the present film is produced continuously, the present film can be recovered in the form of a rolled condition such as a paper tube and a plastic core.

EXAMPLES

The present invention will be illustrated by examples below. Evaluation of the partial polymer composition (D) and the acrylic resin film was carried out by the following methods. In the following descriptions, "parts" means "parts by weight".

(1) Viscosity

The viscosity of the partial polymer composition (D) was measured at 25° C. using a B type viscometer (manufactured by Tokyo Keiki Inc.).

(2) Content of Partial Polymer in Partial Polymer Composition (D)

The partial polymer composition (D) was dissolved at a concentration of 0.05 wt % or less in chloroform (manufactured by Wako Pure Chemical Industries, Ltd.) to obtain a chloroform solution. This chloroform solution was dropped into hexane (manufactured by Wako Pure Chemical Industries, Ltd.) at a ratio of 30 parts or more of hexane to 1 part of chloroform, the precipitate was recovered by suction filtration, and the content of the partial polymer in the partial polymer composition (D) was calculated according to the following formula.

content of partial polymer in partial polymer composition $(D)$=(weight of precipitate after drying/weight of partial polymer composition $(D)$ dissolved in chloroform)$\times 100$ (3) Elastic Modulus Five test pieces of No. 1 dumbbell of the acrylic resin film were produced using Super Dumbbell Cutter (manufactured by dumbbell Co., Ltd., SDK-100D (trade name)) according to JIS K6251. The resultant test pieces were subjected to a tensile test five times at a room temperature of 23° C. and a tensile speed of 500 mm/min using Strograph T (manufactured by Toyo Seiki Seisaku-sho Ltd., trade name), and the average value of the tangent lines of the stress-strain curves in this operation was calculated as the elastic modulus.

(4) Elongation at Break

Five test pieces of No. 1 dumbbell of the acrylic resin film were produced using Super Dumbbell Cutter (manufactured by dumbbell Co., Ltd., SDK-100D (trade name)) according to JIS K6251. The resultant test pieces were subjected to a tensile test five times at a room temperature of 23° C. and a tensile speed of 500 mm/min using Strograph T (manufactured by Toyo Seiki Seisaku-sho Ltd., trade name), and the elongations at break were averaged.

(5) Light Transmission

The acrylic resin film was cut into a 5 square cm piece and the light transmission of the piece was measured using NDH2000 (manufactured by Nippon Denshoku Industries, Co., Ltd., trade name) according to JIS K7361-1.

(6) Haze Value

The acrylic resin film was cut into a 5 square cm piece and the haze value of the piece was measured using NDH2000 (manufactured by Nippon Denshoku Industries, Co., Ltd., trade name) according to JIS K7105.

(7) YI Value

The acrylic resin film was cut into a 5 square cm piece and the YI value of the piece was measured using a spectral colorimeter SE-2000 (manufactured by Nippon Denshoku Industries, Co., Ltd., trade name) according to JIS K7105.

(8) Luminance

The acrylic resin film having a thickness of 400 μm, a LED backlight light source for a note personal computer liquid crystal panel (Manufactured by Samsung, trade name: LTN141AT05) and a reflection sheet having a thickness of 50 μm (manufactured by Reiko Co., Ltd., trade name: Ruyl Miller) were set as shown in FIG. 1, and the luminance of the acrylic resin film was measured.

The acrylic resin film in the form of a square having a length of 10 cm was used. The distance from the end face (i) to the end face (ii) of the acrylic resin film was 10 cm. The surfaces of the end face (i) and the end face (ii) of the acrylic resin film were polished using Plabeauty (manufactured by Megaro Technica Co., Ltd., trade name: PB-500) at a feeding speed of 17.5 mm/sec and a rotation speed of 4000 rpm.

In measuring luminance, a luminance meter (manufactured by Konica Minolta Sensing Inc., trade name: CS-100A) was set at a position 1 m from the end face (ii), and the luminance when a light introduced from the end face (i) was emitted from the end face (ii) was measured.

Example 1

Into a reaction vessel equipped with a cooling tube, a thermometer and a stirring machine were charged 10 parts of Acryester PBOM (polybutylene glycol dimethacrylate manufactured by Mitsubishi Rayon Co., Ltd., number-average molecular weight of (X) is 650, trade name) (A-1) as the di(meth)acrylate (A) represented by the general formula (1), 90 parts of methyl methacrylate (B-1) as the mono(meth)acrylate (B) and 1.5 parts of n-octylmercaptan (manufactured by kanto Chemical Co., Inc.) (n-OM) as the chain transfer agent, and heating of the mixture was initiated while stirring.

When the temperature in the reaction vessel reached 80° C., 0.2 parts of 2,2'-azobis(2,4-dimethylvaleronitrile) (manufactured by Wako Pure Chemical Industries, Ltd. V-65, trade name) was added as the polymerization initiator.

Next, the temperature in the reaction vessel was raised up to 100° C. and kept for 90 minutes, then, quenched with a large amount of ice water down to room temperature, to obtain a partial polymer composition (D-1).

A syrup composition (α-1) was prepared from 78 parts of the resultant partial polymer composition (D-1) and 22 parts of Acryester PBOM (A-1). As the releasing agent, 500 ppm of sodium di(2-ethylhexyl) sulfosuccinate was added, and as the polymerization initiator (β-1), 0.3 parts of 1-hydroxy-cyclohexyl-phenyl-ketone was added, with respect to 100 parts of the syrup composition (α-1), to obtain an active energy ray-polymerizable composition.

The above-described active energy ray-polymerizable composition was cast on a PET film having a thickness of 188 μm (Cosmo Shine A4100 manufactured by Toyobo Co., Ltd, trade name), then, the surface of the cast active energy ray-polymerizable composition was sandwiched by another PET film and allowed to pass through at a rate of 0.13 m/min under a chemical lamp, and photo-polymerized by irradiation at a peak illuminance of 4.0 mW/cm$^2$ and an accumulated light quantity of 3700 mJ/cm$^2$, then, peeled from the PET film and thermally treated for 3 minutes in an air furnace of 65° C., to obtain an acrylic resin film having a thickness of 400 μm. The evaluation results are shown in Table 1.

TABLE 1

| | | | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|---|
| Active Energy Ray-Polymerizable Composition | Syrup Composition (α) | Partial Polymer Composition (D) | kind | α-1 | α-2 | α-3 | α-4 | α-5 | α-6 | α-7 | α-8 | α-9 |
| | | | | D-1 | D-2 | D-3 | D-3 | D-5 | D-6 | D-7 | D-8 | D-9 |
| | | | A-1 (parts) | 10 | 10 | 10 | 30 | 20 | 0 | 0 | 0 | 0 |
| | | | A-2 (parts) | 0 | 0 | 0 | 0 | 0 | 10 | 0 | 0 | 0 |
| | | | A-3 (parts) | 0 | 0 | 0 | 0 | 0 | 0 | 10 | 0 | 0 |
| | | | A-4 (parts) | 0 | 0 | 0 | 0 | 0 | 0 | 0 | 10 | 0 |
| | | | A-5 (parts) | 0 | 0 | 0 | 0 | 0 | 0 | 0 | 0 | 10 |
| | | | B-1 (parts) | 90 | 90 | 90 | 70 | 80 | 90 | 90 | 90 | 90 |
| | | | V-65 (parts) | 0.2 | 0.02 | 0.02 | 0.05 | 0.018 | 0.2 | 0.2 | 0.2 | 0.065 |
| | | | n-OM (parts) | 1.5 | 0.4 | 0.4 | 3.0 | 1 | 1.5 | 1.5 | 1.5 | 0.4 |
| | | | Polymerization Time (min) | 90 | 60 | 60 | 47 | 120 | 90 | 90 | 90 | 30 |
| | | | Viscosity (mPa · s) | 4400 | 300 | 300 | 4000 | 370 | 2800 | 350 | 450 | 660 |
| | | | Content of Copolymer (C) (wt %) | 38 | 15 | 15 | 38 | 17 | 23 | 23 | 35 | 20 |
| | | | Compounding Amount (parts) | 78 | 78 | 89 | 57 | 50 | 89 | 45 | 47 | 78 |
| | | Component A (A-1) | Compounding Amount (parts) | 22 | 22 | 11 | 43 | 50 | 0 | 0 | 0 | 0 |
| | | Component A (A-2) | Compounding Amount (parts) | 0 | 0 | 0 | 0 | 0 | 11 | 0 | 0 | 0 |
| | | Component A (A-3) | Compounding Amount (parts) | 0 | 0 | 0 | 0 | 0 | 0 | 15 | 0 | 0 |
| | | Component A (A-4) | Compounding Amount (parts) | 0 | 0 | 0 | 0 | 0 | 0 | 0 | 11 | 0 |
| | | Component A (A-5) | Compounding Amount (parts) | 0 | 0 | 0 | 0 | 0 | 0 | 0 | 0 | 22 |
| | | Component B (B-1) | Compounding Amount (parts) | 0 | 0 | 0 | 0 | 0 | 0 | 40 | 42 | 0 |
| | | A/B* | (Weight Ratio) | 30/70 | 30/70 | 20/80 | 60/40 | 60/40 | 20/80 | 20/80 | 15/85 | 30/70 |
| | Polymerization Initiator (β-1) | | Compounding Amount (parts) | 0.3 | 0.3 | 0.3 | 0.3 | 0.3 | 0.3 | 0.3 | 0.3 | 0.3 |
| Viscosity(mPa · s) | | | | 2300 | 290 | 300 | 600 | 190 | 1500 | 35 | 11 | 775 |

TABLE 1-continued

|  |  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Evaluation Results of (Meth)acrylic Resin Film | Elastic Modulus (MPa) | 1600 | 1500 | 1900 | 44 | 97 | 1400 | 1400 | 1400 | 2000 |
|  | Elongation at Break (%) | 36 | 33 | 12 | 90 | 77 | 15 | 34 | 4.3 | 5.1 |
|  | Light Transmission | 92.5 | 93.3 | 93.3 | 92.5 | 92.5 | 92.2 | 91.8 | 91.1 | 92.61 |
|  | Haze Value (%) | 0.2 | 0.1 | 0.0 | 1.1 | 1.1 | 1.6 | 10.8 | 34.9 | 0.3 |
|  | YI Value (—) | 0.51 | 0.46 | 0.47 | 0.56 | 0.56 | 1.1 | 3.0 | 5.6 | 0.68 |
|  | Luminance (cd/m2) | 2200 | 2200 | 2300 | 1400 | 1400 | 1300 | 560 | 340 | 1630 |

*Component A and constituent unit derived from component A in copolymer (C)/component B and constituent unit derived from component B in copolymer (C)

Examples 2 to 5

Acrylic resin films having a thickness shown in Table 1 were obtained in the same manner as in Example 1 excepting that the values of Acryester PBOM (A-1), methyl methacrylate (B-1), chain transfer agent (n-OM), initiator (V-65) and polymerization time were changed as shown in Table 1. The evaluation results are shown in Table 1.

Example 6

An acrylic resin film having a thickness shown in Table 1 was obtained in the same manner as in Example 1 excepting that polybutylene glycol dimethacrylate (A-2) in which the number-average molecular weight of (X) was 1400 was used as the di(meth)acrylate (A) represented by the general formula (1), and the values of (A-2), methyl methacrylate (B-1), chain transfer agent (n-OM), initiator (V-65) and polymerization time were changed as shown in Table 1. The evaluation results are shown in Table 1.

Example 7

An acrylic resin film having a thickness shown in Table 1 was obtained in the same manner as in Example 1 excepting that polybutylene glycol dimethacrylate (A-3) in which the number-average molecular weight of (X) was 2000 was used as the di(meth)acrylate (A) represented by the general formula (1), and the values of (A-3), methyl methacrylate (B-1), chain transfer agent (n-OM), initiator (V-65) and polymerization time were changed as shown in Table 1. The evaluation results are shown in Table 1.

Example 8

An acrylic resin film having a thickness shown in Table 1 was obtained in the same manner as in Example 1 excepting that polybutylene glycol dimethacrylate (A-4) in which the number-average molecular weight of (X) was 2900 was used as the di(meth)acrylate (A) represented by the general formula (1), and the values of (A-4), methyl methacrylate (B-1), chain transfer agent (n-OM), initiator (V-65) and polymerization time were changed as shown in Table 1. The evaluation results are shown in Table 1.

Example 9

An acrylic resin film having a thickness shown in Table 1 was obtained in the same manner as in Example 1 excepting that hexanediol polycarbonate dimethacrylate (A-5) manufactured by Ube Industries, Ltd. (number-average molecular weight of (X) is 1000, trade name) was used as the di(meth)acrylate (A) represented by the general formula (1), the values of methyl methacrylate (B-1), chain transfer agent (n-OM), initiator (V-65) and polymerization time were changed as shown in Table 1 and the initiator was added when the temperature in the reaction vessel reached 90° C. The evaluation results are shown in Table 1.

Comparative Example 1

To a monomer mixture of 30 parts of Acryester PBOM (A-1) and 70 parts of methyl methacrylate (B-1), sodium di(2-ethylhexyl) sulfosuccinate was added as the releasing agent in an amount of 500 ppm with respect to 100 parts of the monomer mixture and 0.3 parts of 1-hydroxy-cyclohexylphenylketone was added as the polymerization initiator (β), to obtain an active energy ray-polymerizable composition. An acrylic resin film was tried to be produced in the same manner as in Example 1 using this active energy ray-polymerizable composition, however, the active energy ray-polymerizable composition exuded and leaked from upper and lower clearances of the PET film, and an acrylic resin film having uniform thickness could not be produced.

EXPLANATION OF MARKS

1: acrylic resin film
2: reflection sheet
3: light source
4: end face (i)
5: end face (ii)

The invention claimed is:
1. A polymerizable composition comprising a syrup composition (α) and a polymerization initiator (β), wherein
the syrup composition (α) comprises a copolymer (C) and at least one of: i) a di(meth)acrylate (A) represented by formula (1)

$$CH_2=CR^1-COO-(X)-COCR^1=CH_2 \qquad (1),$$

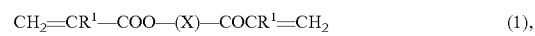

and ii) a mono(meth)acrylate (B);
said copolymer (C) is obtained by polymerizing a monomer mixture comprising from 1 to 60 wt % of said di(meth)acrylate (A) represented by formula (1) and from 40 to 99 wt % of said mono(meth)acrylate (B),
wherein (X) of formula (1) represents at least one residue selected from the group consisting of a polyalkylene glycol, a polyester diol, and a polycarbonate diol, each of said polyalkylene glycol, a polyester diol, and a polycarbonate diol having a number-average molecular weight of 500 or more, and R' of formula (1) represents H or $CH_3$.

2. The polymerizable composition according to claim 1, wherein
the syrup composition (α) is obtained by mixing a partial polymer composition (D) with a second monomer mixture;
said partial polymer composition (D) is obtained by polymerization of a first monomer mixture comprising from 1 to 60 wt % of the di(meth)acrylate (A) and from 40 to 99 wt % of the mono(meth)acrylate (B), the sum of the content of the di(meth)acrylate (A) and the content of the mono(meth)acrylate (B) is 100 wt %; and, said the second monomer mixture comprises said di(meth) acrylate (A) represented by formula (1) and said mono (meth)acrylate (B).

3. The polymerizable composition according to claim 2, wherein, the content rate of the di(meth)acrylate (A) in the second monomer mixture is larger than the content rate of the di(meth)acrylate (A) in the first monomer mixture, and the content rate of the mono(meth)acrylate (B) in the second monomer mixture is smaller than the content rate of the mono(meth)acrylate (B) in the first monomer mixture.

4. The polymerizable composition according to claim 1, wherein the polymerization initiator (β) is a photo-polymerization initiator, and the polymerizable composition is an active energy ray-polymerizable composition.

5. An acrylic resin film obtained by polymerizing and curing the polymerizable composition according to claim 1.

6. The polymerizable composition according to claim 2, wherein said partial polymer composition (D) has a viscosity of from 100 to 5,000 mPa·s.

7. The polymerizable composition according to claim 2, wherein said partial polymer composition (D) further comprises a chain transfer agent.

8. The polymerizable composition according to claim 2, wherein said partial polymer composition (D) further comprises a chain transfer agent selected from the group consisting of n-butylmercaptan, n-dodecylmercaptan, n-octylmercaptan, and α-methylstyrene dimer.

9. The polymerizable composition according to claim 2, wherein said partial polymer composition (D) further comprises a chain transfer agent selected from the group consisting of n-butylmercaptan, n-dodecylmercaptan, n-octylmercaptan, and α-methylstyrene dimer, where said chain transfer agent is present in said partial polymer composition (D) in an amount of from 0.01 to 10 parts by weight with respect to 100 parts by weight of the monomer mixture.

10. The polymerizable composition according to claim 2, wherein said partial polymer composition (D) further comprises a chain transfer agent selected from the group consisting of n-butylmercaptan, n-dodecylmercaptan, n-octylmercaptan, and α-methylstyrene dimer, where said chain transfer agent is present in said partial polymer composition (D) in an amount of from 0.1 to 5 parts by weight with respect to 100 parts by weight of the monomer mixture.

11. The polymerizable composition according to claim 2, wherein said partial polymer composition (D) further comprises a chain transfer agent selected from the group consisting of n-butylmercaptan, n-dodecylmercaptan, n-octylmercaptan, and α-methylstyrene dimer, where said chain transfer agent is present in said partial polymer composition (D) in an amount of from 0.2 to 0.5 parts by weight with respect to 100 parts by weight of the monomer mixture.

12. The polymerizable composition according to claim 1, wherein said monomer mixture comprises from 5 to 40 wt % of said di(meth)acrylate (A) represented by formula (1) and from 60 to 95 wt % of said mono(meth)acrylate (B).

13. The polymerizable composition according to claim 1, wherein said monomer mixture comprises from 10 to 30 wt % of said di(meth)acrylate (A) represented by formula (1) and from 70 to 90 wt % of said mono(meth)acrylate (B).

14. The polymerizable composition according to claim 1, wherein said polymerization initiator (β) comprises at least one member selected from the group consisting of 1-hydroxy-cyclo-hexylphenylketone; 2-hydroxy-2-methyl-1-phenylpropan-1-one; methyl phenyl glyoxylate; acetophenone; benzophenone; diethoxyacetophenone; 2,2-dimethoxy-2-phenylacetophenone; 1-phenyl-1,2-propanedione-2-(o-ethoxycarbonyl)oxime; 2-methyl[4-(methylthio)phenyl]-2-morpholino-1-propanone; benzyl, benzoin methyl ether; benzoin ethyl ether; benzoin isopropyl ether; benzoin isobutyl ether; 2-chlorothioxanthone; isopropylthioxanthone; 2,4,6-trimethyl-benzoyl diphenylphosphine oxide; benzoyl diphenylphosphine oxide; 2-methyl-benzoyl diphenylphosphine oxide; and benzoyl dimethoxyphosphine oxide.

15. The polymerizable composition according to claim 1, wherein said polymerization initiator (β) is present in said polymerizable composition in an amount of from 0.005 to 5 parts by weight with respect to 100 parts by weight of the syrup composition (α).

16. The polymerizable composition according to claim 1, wherein said polymerization initiator (β) is present in said polymerizable composition in an amount of from 0.01 to 1 parts by weight with respect to 100 parts by weight of the syrup composition (α).

17. The polymerizable composition according to claim 1, wherein said polymerization initiator (β) is present in said polymerizable composition in an amount of from 0.05 to 0.5 parts by weight with respect to 100 parts by weight of the syrup composition (α).

* * * * *